United States Patent
Ichioka et al.

(10) Patent No.: US 9,780,385 B2
(45) Date of Patent: Oct. 3, 2017

(54) PROCESS FOR PRODUCING OXYGEN REDUCING CATALYST AND USES THEREOF

(75) Inventors: Kazunori Ichioka, Tokyo (JP); Takuya Imai, Tokyo (JP); Chunfu Yu, Tokyo (JP)

(73) Assignee: SHOWA DENKO K.K., Tokyo (JP)

(*) Notice: Subject to any disclaimer, the term of this patent is extended or adjusted under 35 U.S.C. 154(b) by 578 days.

(21) Appl. No.: 14/237,277

(22) PCT Filed: May 10, 2012

(86) PCT No.: PCT/JP2012/061991
§ 371 (c)(1),
(2), (4) Date: Feb. 5, 2014

(87) PCT Pub. No.: WO2013/021698
PCT Pub. Date: Feb. 14, 2013

(65) Prior Publication Data
US 2014/0178790 A1    Jun. 26, 2014

(30) Foreign Application Priority Data
Aug. 8, 2011 (JP) ................. 2011-172995

(51) Int. Cl.
*H01M 4/90* (2006.01)
*H01M 8/10* (2016.01)
*H01M 8/1007* (2016.01)

(52) U.S. Cl.
CPC ....... *H01M 4/9091* (2013.01); *H01M 4/9041* (2013.01); *H01M 8/1007* (2016.02)

(58) Field of Classification Search
CPC .... H01M 4/9091; H01M 4/9041; H01M 4/90; H01M 8/1002; H01M 8/10; H01M 8/1007; Y02E 60/50; Y02E 60/522
See application file for complete search history.

(56) References Cited

U.S. PATENT DOCUMENTS

2004/0010160 A1    1/2004 Coleman et al.
2004/0177556 A1*   9/2004 Hagemeyer ............ B01J 23/464
                                                                48/198.7
(Continued)

FOREIGN PATENT DOCUMENTS

CN    1642635 A    7/2005
JP    H08-253888    * 10/1996 ............... C25C 1/08
(Continued)

OTHER PUBLICATIONS

Byon et al.; "Graphene-Based Non-Noble-Metal Catalysts for Oxygen Reduction Reaction in Acid."; Chemistry of Materials; vol. 23; Jul. 18, 2011; pp. 3421-3428; XP002736284; DOI: 10.1021/cm2000649.

Schulenburg et al.; "Catalysts for the Oxygen Reduction From Heat Treated Iron(III)Tetramethoxyphenylporphyrin Chloride: Structure and Stability of Active Sites."; J. Phys. Chem. B; vol. 107; Jul. 19, 2003; pp. 9034-9041; XP002736285; DOI: 10.1021/jp030349j.
(Continued)

*Primary Examiner* — Patrick Ryan
*Assistant Examiner* — Aaron Greso
(74) *Attorney, Agent, or Firm* — Sughrue Mion, PLLC

(57) ABSTRACT

A process for producing an oxygen reducing catalyst including a step of heat-treating, in a non-oxidizing atmosphere, a catalyst precursor including a compound (i) supplying a carbon element and a nitrogen element by heating in a non-oxidizing atmosphere, and a compound (ii) containing at least one element of iron and cobalt. Also disclosed is an oxygen reducing catalyst, a fuel cell catalyst layer including the oxygen reducing catalyst, an electrode including the fuel cell catalyst layer, a membrane-electrode assembly including the electrode and a fuel cell including the membrane-electrode assembly.

22 Claims, 2 Drawing Sheets

(56) References Cited

U.S. PATENT DOCUMENTS

| | | | |
|---|---|---|---|
| 2006/0128565 A1* | 6/2006 | Flytzani-Stephanopoulos | B01J 23/52 502/439 |
| 2006/0280987 A1* | 12/2006 | Kanaoka | C08J 5/2256 429/483 |
| 2011/0136036 A1 | 6/2011 | Miyata et al. | |
| 2012/0231338 A1 | 9/2012 | Matsuzaka et al. | |
| 2013/0288888 A1 | 10/2013 | Miyata et al. | |

FOREIGN PATENT DOCUMENTS

| | | | | |
|---|---|---|---|---|
| JP | 2001-247315 | * | 9/2001 | ............ C01G 49/00 |
| JP | 2004-217507 A | | 8/2004 | |
| JP | 2007-026746 A | | 2/2007 | |
| JP | 2007-175578 A | | 7/2007 | |
| JP | 2008-021638 | * | 1/2008 | .......... H01M 4/9091 |
| JP | 2008-021638 A | | 1/2008 | |
| JP | 2009-291706 A | | 12/2009 | |
| JP | 4555897 B2 | | 10/2010 | |
| WO | 2011/070975 A1 | | 6/2011 | |

OTHER PUBLICATIONS

Maldonado et al. "Influence of Nitrogen Doping on Oxygen Reduction Electrocatalysis at Carbon Nanofiber Electrodes"; J. Phys. Chem. B; vol. 109; Feb. 19, 2005; pp. 4707-4716; XP002736286; DOI:10.1021/jp044442z.

Proietti et al.; "Iron-Based Cathode Catalyst With Enhanced Power Density in Polymer Electrolyte Membrane Fuel Cells"; Nature Communications; 1427; Aug. 2, 2011; pp. 1-9; XP002736287; DOI: 10.1038/ncomms1427.

Communication dated Mar. 9, 2015 from the European Patent Office in counterpart Application No. 12821767.6.

International Search Report dated Aug. 21, 2012 for International Application No. PCT/JP2012/061991.

Jun Maruyama et al.; "Catalysis at carbonized red blood cell for oxygen reduction and its application to polymer electrolyte fuel cells"; TANSO; 2005 [No. 218]; pp. 149-154.

Jun Maruyama et al; "Possibility of carbon materials with iron atoms bound to the surface by heat-treatment as cathode catalysts of fuel cells"; TANSO; 2005 [No. 218]; pp. 163-172.

Jun-ichi Ozaki; "Preparation of cathode catalysts for PEMFC by carbon-alloying techniques"; TANSO; 2005 [No. 218]; pp. 178-184.

* cited by examiner

PROCESS FOR PRODUCING OXYGEN REDUCING CATALYST AND USES THEREOF

CROSS REFERENCE TO RELATED APPLICATIONS

This is a National Stage of International Application No. PCT/JP2012/061991 filed May 10, 2012, claiming priority based on Japanese Patent Application No. 2011-172995 filed Aug. 8, 2011, the contents of all of which are incorporated herein by reference in their entirety.

TECHNICAL FIELD

The present invention relates to a process for producing an oxygen reducing catalyst and uses thereof. In more detail, the present invention relates to a process for producing an oxygen reducing catalyst comprising at least one of iron and cobalt as a metal that has catalytic performance sufficient in practical uses.

BACKGROUND ART

A polymer electrolyte fuel cell is a fuel cell in which a polymer solid electrolyte is sandwiched between an anode and a cathode, a fuel is supplied to the anode, and oxygen or air is supplied to the cathode, whereby oxygen is reduced at the cathode to produce electricity. As the fuel, hydrogen, methanol, or the like is mainly used.

To enhance a reaction rate in a fuel cell and to enhance the energy conversion efficiency of the fuel cell, a layer containing a catalyst (hereinafter also referred to as a "fuel cell catalyst layer") has been conventionally disposed on the surface of a cathode (air electrode) or the surface of an anode (fuel electrode) of the fuel cell.

As such a catalyst, noble metals have been generally used, and among the noble metals, platinum, which is stable at a high potential and has a high activity, has been mainly used. However, since these noble metals are expensive and limited in resource amount, development of alternative catalysts has been desired.

Under these circumstances, the research of iron-containing catalysts as a catalyst alternative to noble metals is underway.

Iron is more inexpensive and its resource amount abundant, compared with noble metal materials such as platinum.

Patent Literature 1 discloses a process for producing an iron-containing activated carbon obtained by heat-treating an activated carbon and an iron protein, and describes a fuel cell catalyst containing this activated carbon.

Patent Literature 2 discloses a process for producing an iron-containing carbon raw material including steps of mixing an iron salt, a nitrogen-containing compound and a carbohydrate and heat-treating the mixture in an inert atmosphere, and describes a fuel cell catalyst containing this raw material.

Non-Patent Literature 1 discloses a catalyst composed of an iron-containing carbide obtained by heat-treating erythrocyte containing, as a main component, hemoglobin, which is an iron protein.

Non-Patent Literature 2 discloses a catalyst where an iron atom is bonded to a carbon material, which is prepared by supporting a macrocyclic complex of iron on a carbon material, and then heat-treating the supported iron complex in an inert atmosphere.

Non-Patent Literature 3 discloses a fuel cell catalyst composed of a metal alloy carbon obtained by incorporating iron in the form of an acetylacetonato complex or a phthalocyanine complex to a carbon raw material organic matter and carbonizing the mixture.

Conventional catalysts alternative to noble metals including iron-containing catalysts as described above provide a certain level of performance, but their oxygen reducing ability is insufficient, and their performance is unsatisfactory in practical uses.

CITATION LIST

Patent Literatures

[Patent Literature 1] JP-B-4555897
[Patent Literature 2] JP-A-2008-21638

Non-Patent Literatures

[Non-Patent Literature 1] Jun MARUYAMA, Ikuo ABE, Carbon 218, 149 (2005)
[Non-Patent Literature 2] Jun MARUYAMA, Ikuo ABE, carbon 218, 163 (2005)
[Non-Patent Literature 3] Junichi OZAKI, Carbon 218, 178 (2005)

SUMMARY OF THE INVENTION

Technical Problem

The present invention seeks to overcome such problems as seen in conventional techniques. That is, it is an object of the present invention to provide a process for producing a catalyst alternative to noble metals which has an oxygen reducing ability sufficient in practical uses.

Technical Solution

The present invention, accomplishing the above object, relates to, for example, the following [1] to [23].

(1) A process for producing an oxygen reducing catalyst comprising a step of heat-treating, in a non-oxidizing atmosphere, a catalyst precursor comprising:
  a compound (i) supplying a carbon element and a nitrogen element by heating in a non-oxidizing atmosphere, and
  a compound (ii) comprising at least one element of iron and cobalt.

(2) The process for producing an oxygen reducing catalyst according to (1) described above, wherein the compound (ii) is a compound not containing titanium.

(3) The process for producing an oxygen reducing catalyst according to (1) or (2) described above, wherein the ratio of the atomic number of carbon contained in the oxygen reducing catalyst to the total atomic number of iron and cobalt contained in the oxygen reducing catalyst is 10 to 65, provided that the total atomic number of the metal elements is 1.

(4) The process for producing an oxygen reducing catalyst according to any one of (1) to (3) described above, wherein at least one of the compound (i) and the compound (ii) is a compound supplying an oxygen atom by heating in an non-oxidizing atmosphere.

(5) The process for producing an oxygen reducing catalyst according to any one of (1) to (4) described above, wherein the compound (ii) is at least one selected from organic acid salts, inorganic acid salts, organic complexes, inorganic complexes, alkoxides and other organometallic compounds.

(6) The process for producing an oxygen reducing catalyst according to any one of (1) to (5) described above, wherein the compound (i) is an α-nitrogen carboxylic acid.

(7) The process for producing an oxygen reducing catalyst according to (6) described above, wherein the α-nitrogen carboxylic acid is at least one selected from glycine, glycylglycine, alanine, alanylalanine and norvaline.

(8) The process for producing an oxygen reducing catalyst according to any one of (1) to (7) described above, which further comprises a step of mixing the compound (i), the compound (ii) and a solvent to prepare a catalyst precursor solution and then removing the solvent from the catalyst precursor solution to prepare the catalyst precursor.

(9) The process for producing an oxygen reducing catalyst according to (8) described above, wherein the pH of the catalyst precursor solution is controlled to be not more than 4 by using an organic acid.

(10) The process for producing an oxygen reducing catalyst according to (9) described above, wherein the organic acid is acetic acid.

(11) The process for producing an oxygen reducing catalyst according to any one of (8) to (10) described above, wherein the catalyst precursor solution contains 1 to 20% by mass of a ketone, an alcohol or an ether.

(12) The process for producing an oxygen reducing catalyst according to (11) described above, wherein the catalyst precursor solution comprises a ketone, and the ketone is 1,3-diketone.

(13) The process for producing an oxygen reducing catalyst according to any one of (1) to (12) described above, wherein the non-oxidizing atmosphere is:

at least one gas atmosphere selected from nitrogen, argon, ammonia and hydrogen cyanide, or a mixed gas atmosphere of at least one gas selected from nitrogen, argon, ammonia and hydrogen cyanide and at least one gas selected from hydrogen, methane, propane, butane and carbon monoxide.

(14) The process for producing an oxygen reducing catalyst according to any one of (1) to (13) described above, wherein the heat treatment temperature is 800 to 1100° C.

(15) The process for producing an oxygen reducing catalyst according to any one of (1) to (14) described above, wherein the heating rate in the heat treatment is 10 to 40° C./min.

(16) An oxygen reducing catalyst obtained by the production process according to any one of (1) to (15) described above.

(17) The oxygen reducing catalyst according to (16) described above, wherein the proportion of atomic numbers of iron, cobalt, carbon, nitrogen and oxygen in elements contained in the oxygen reducing catalyst is (total atomic number of iron and cobalt):atomic number of carbon:atomic number of nitrogen:atomic number of oxygen=1:x:y:z wherein 10≤x≤65, 0<y≤2 and 0<z≤20.

(18) The oxygen reducing catalyst according to (16) or (17) described above, which is a fuel cell electrode catalyst.

(19) A fuel cell catalyst layer comprising the oxygen reducing catalyst according to (18) described above.

(20) An electrode comprising the fuel cell catalyst layer according to (19) described above, and a gas diffusion layer.

(21) A membrane-electrode assembly comprising a cathode, an anode and an electrolyte membrane interposed between the cathode and the anode, wherein the cathode and/or the anode is the electrode according to (20) described above.

(22) A fuel cell comprising the membrane-electrode assembly according to (21) described above.

(23) A polymer electrolyte fuel cell comprising the membrane-electrode assembly according to (21) described above.

Advantageous Effects of the Invention

The process for producing an oxygen reducing catalyst of the present invention can provide an oxygen reducing catalyst comprising at least one of iron and cobalt as a metal that has an oxygen reduction ability sufficient in practical uses.

DESCRIPTION OF EMBODIMENTS

Figure 1:
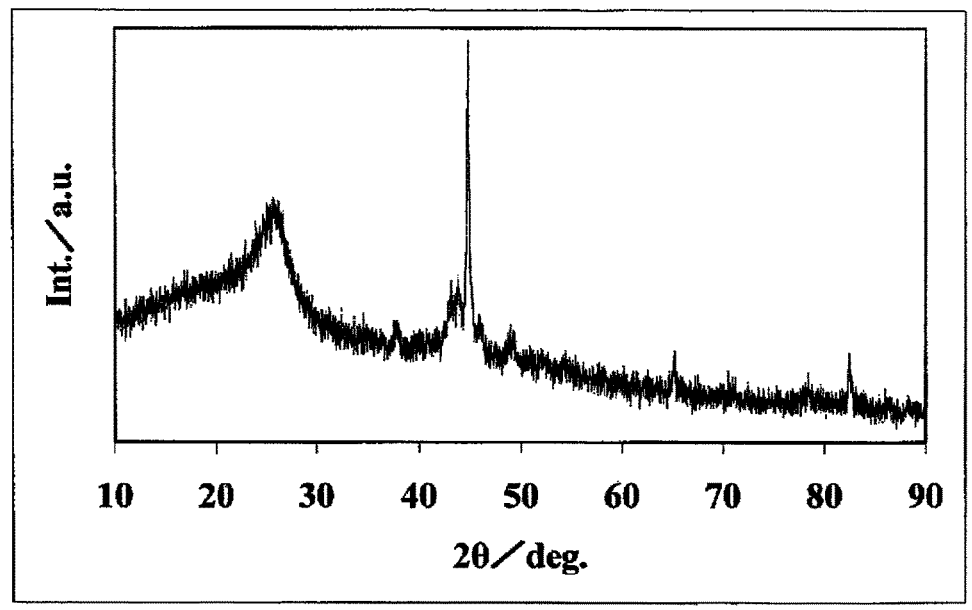
FIG. 1 is powder X-ray diffraction spectrum of a catalyst (1).

The process for producing an oxygen reducing catalyst of the present invention comprises a step of heat-treating, in a non-oxidizing atmosphere, a catalyst precursor comprising a compound supplying a carbon element and a nitrogen element (hereinafter referred to as the "compound supplying carbon and nitrogen") by heating in a non-oxidizing atmosphere, and a compound containing at least one element of iron and cobalt (hereinafter referred to as the "compound containing iron and/or cobalt").

The process for producing an oxygen reducing catalyst of the present invention preferably comprises Step 1 of mixing a compound supplying carbon and nitrogen with a compound containing iron and/or cobalt to prepare a catalyst precursor, and Step 2 of heat-treating the catalyst precursor obtained in Step 1 in a non-oxidizing atmosphere.

Step 1

Step 1 is a step of mixing a compound supplying carbon and nitrogen with a compound containing iron and/or cobalt to prepare a catalyst precursor. Step 1 preferably includes Step (I) of mixing a compound supplying carbon and nitrogen, a compound containing iron and/or cobalt and a solvent with one another to prepare a solution (hereinafter referred to as the "catalyst precursor solution"), and Step (II) of removing the solvent from the catalyst precursor solution to prepare a catalyst precursor.

In Step 1, a compound containing a metal element other than iron and cobalt may be used. In Step (I), a compound supplying carbon and nitrogen, and a compound containing iron and/or cobalt, a compound containing a metal element other than iron and cobalt and a solvent may be mixed with one another to prepare a catalyst precursor solution.

<Compound Supplying Carbon and Nitrogen>

The compound supplying carbon and nitrogen is a compound that provides the oxygen reducing catalyst with carbon and nitrogen, which are constituent elements of the catalyst, through a catalyst precursor, by heating in a non-oxidizing atmosphere, namely serving as a carbon and nitrogen source of the oxygen reducing catalyst.

The non-oxidizing atmosphere is an atmosphere that does not oxidize a heat-treated product, namely an inert or reducing atmosphere. Specifically, a heat treatment atmosphere indicated later can be mentioned.

The "heating" is elevating temperature until a predetermined temperature at a predetermined rate by using a heater or the like preferably under controlled atmosphere, and then retaining at a predetermined temperature. Specific examples of the heat treatment are described later.

The compound supplying carbon and nitrogen is a compound containing in the molecule at least a carbon atom and a nitrogen atom. Examples thereof include organic compounds having a functional group such as amino group, nitrile group, imide group, imine group, nitro group, amide group, azide group, aziridine group, azo group, isocyanate group, isothiocyanate group, oxime group, diazo group, nitroso group; or having a ring such as pyrrole ring, porphyrin ring, pyrrolidine ring, imidazole ring, triazole ring, pyridine ring, piperidine ring, pyrimidine ring, pyrazine ring, purine ring (these functional groups and rings are collected called also "nitrogen-containing molecular group"). Examples of these organic compounds include melamine, ethylenediamine, triazole, acetonitrile, acrylonitrile, ethyleneimine, aniline, pyrrole, and salts thereof. The compound supplying carbon and nitrogen may be a polymer of any of the above compounds, and for example, polyethyleneimine and polyvinylpyrrolidone can be mentioned.

Preferably, the compound supplying carbon and nitrogen also serves as a compound supplying oxygen, which is a constituent element of the oxygen reducing catalyst, by heating in a non-oxidizing atmosphere. Such compounds are advantageous because from the same compound, carbon, nitrogen and oxygen, which are constituent elements of the oxygen reducing catalyst, can be obtained. Such a compound contains in the molecule at least a carbon element, a nitrogen element and an oxygen element, and is preferably a carboxylic acid having a nitrogen-containing functional group.

The carboxylic acid having a nitrogen-containing functional group is more preferably an α-nitrogen carboxylic acid, more preferably an α-amino acid having an amino group and a carboxyl group, and a derivative thereof.

The amino acid and derivatives thereof are particularly preferably glycine, glycylglycine, alanine, alanylalanine, norvaline and the like. The α-nitrogen carboxylic acid is a compound having a structure in which to a carbon atom to which a carboxyl group is bonded, a nitrogen atom of a nitrogen-containing functional group is bonded.

The compound supplying carbon and nitrogen is preferably a compound capable of becoming a ligand that can be coordinated to iron and/or cobalt in the compound containing iron and/or cobalt, preferably a compound capable of forming a mononuclear complex. Further preferred is a compound capable of becoming a multidentate ligand, i.e., compound capable of forming a chelate, and among them, more preferred is a compound capable of a bidentate ligand or a tridentate ligand. When the compound supplying carbon and nitrogen is a compound capable of forming a chelate, there is an advantage that by chelate effect, a stable metal (Fe, Co)—(O, N) bond can be formed. An example of the compound capable of forming a chelate other than the above-mentioned amino acids is ethylenediamine.

<Compound Containing Iron and/or Cobalt>

The compound containing iron and/or cobalt is a compound that supplies the oxygen reducing catalyst with a metal element constituting the catalyst (i.e., at least one of an iron element and a cobalt element). The compound containing iron and/or cobalt may contain a metal element other than iron and cobalt. However, the compound containing iron and/or cobalt is preferably a titanium-free compound so that the catalyst precursor does not contain titanium. From the titanium-free catalyst precursor, a titanium-free catalyst can be obtained.

When the compound containing iron and/or cobalt contains iron as a metal element, this compound is preferable in terms of providing an oxygen reducing catalyst with high activity. When the compound containing iron and/or cobalt contains an iron element alone as a metal element, this compound is more preferable in terms of providing an oxygen reducing catalyst with much higher activity.

The compound containing iron and/or cobalt may be the same as the compound supplying carbon and nitrogen. At this time, the inclusion of only such a compound in the catalyst precursor is sufficient, as the compound supplying carbon and nitrogen and the compound containing iron and/or cobalt.

In the incorporation of iron and cobalt into the catalyst precursor, the compound containing iron and/or cobalt may be a compound containing iron and cobalt in the same molecule, or may be two kinds of compounds: an iron-containing compound and a cobalt-containing compound.

The compound containing iron and/or cobalt preferably contains at least one element of iron and cobalt, and includes at least one selected from organic acid salts, inorganic acid salts, organic complexes, inorganic complexes, alkoxides and other organometallic compounds.

Examples of the organic acid salts include acetates, gluconates, fumarates and oxalates. Of these, acetates are preferable, which have high solubility in water.

Examples of the inorganic acid salts include chloride salts, sulfates, nitrates and phosphorates. Of these, chloride salts are preferred, which have high solubility in water.

Examples of the organic complexes include acetylacetonato complexes, 1,10-phenanthroline complexes, tetraphenylporphyrin complexes and ethylenediamine tetraacetic acid complexes. Of these, acetylacetonato complexes are preferable, which have easy solubility in aqueous substances and organic substances.

Examples of the inorganic complexes include cyano complexes, amine complexes, nitrosyl complexes and thiocyanogen complexes. Of these, cyano complexes are preferable, which have high solubility in water.

Examples of the alkoxides include ethoxide, methoxide and propoxide. Of these, ethoxide is preferable, which is relatively inexpensive and readily available.

Examples of the other organometallic compounds are cyclopentadienyl compounds and derivatives of cyclopentadienyl compounds. Of these, cyclopentadienyl compounds and derivative thereof are preferable.

Preferably, the compound containing iron and/or cobalt serves also as a compound that supplies oxygen, which is a constituent element of the oxygen reducing catalyst, by heating in a non-oxidizing atmosphere.

The compound supplying oxygen is a compound that provides the oxygen reducing catalyst with oxygen, which is a constituent element of the catalyst, through the catalyst precursor, namely a compound serving as an oxygen source of the oxygen reducing catalyst.

In the process for producing an oxygen reducing catalyst of the present invention, at least one of the compound supplying carbon and nitrogen and the compound containing iron and/or cobalt is preferably a compound supplying oxygen.

<Solvent>

Examples of the solvent include water, alcohols and acids. As the alcohols, ethanol, methanol, butanol, propanol, and ethoxyethanol are preferred; and ethanol and methanol are further preferred. In order to increase solubility, the inclusion of an acid in the solvent is preferable. As the acids, acetic acid, nitric acid, hydrochloric acid, phosphoric acid and citric acid are preferred; and acetic acid also serving as a solvent is further preferred. These may be used singly or in combination of two or more kinds.

<Preparation of Catalyst Precursor>

In Step (I), exemplary procedures for preparing the catalyst precursor solution are procedure (i) and procedure (ii) described below.

procedure (i): all the necessary compounds are mixed together with one solvent.

procedure (ii): respective necessary compounds are mixed with respective solvents to obtain raw material compound solutions, and these raw material compound solutions are mixed with one another. Solvents used at this time may be different from another, or may be the same.

The necessary compounds indicated here refers to compounds supplying carbon and nitrogen, compounds containing iron and/or cobalt, compounds containing an optionally-added metal other than iron and cobalt, and other optionally-added compounds.

Preferably, the catalyst precursor solution does not contain precipitate or dispersoid, but may contain these at a small amount (for example, 10% by mass or less, preferably 5% by mass or less, more preferably 2% by mass or less of the whole amount of the solution).

In procedure (ii), the mixing of two or more kinds of raw material compound solutions can involve the occurrence of precipitate and dispersoid. These are considered to contain a reaction product between the compound containing iron and/or cobalt and the compound supplying carbon and nitrogen, and thus may be contained in the catalyst precursor solution.

In procedure (ii), if the mixing of the raw material compound solutions involve the occurrence of precipitate and dispersoid, it is preferred that a solution containing no precipitate and dispersoid is used as the raw material compound solutions and this solution is added little by little, and thereby mixing is performed such that no precipitate and dispersoid will rapidly occur.

In Step (I), mixing may be performed while pressure more than ordinary pressure is applied to a pressure-applicable container such as an autoclave.

Step (I) may be performed with heating or cooling in a range that does not have an adverse effect on operation. Step (I) is performed at a temperature range, for example, from 0 to 90° C. If the temperature in Step (I) is too low, the formation of a complex by the compound containing iron and/or cobalt and by the compound supplying carbon and nitrogen can be insufficient, or mixing can be insufficient.

If the temperature in Step (I) is too high, iron and/or cobalt can be precipitated as a hydroxide.

In Step (I), the mixing ratio of the compound supplying carbon and nitrogen to the compound containing iron and/or cobalt is determined such that the ratio (A/M) of the substance amount of carbon atom contained in both the compounds, A mol, to the total of the substance amount of iron and the substance amount of cobalt that are contained in both the compounds, M mol, is preferably 500 or less, more preferably 400 or less, particularly preferably 300 or less, and is determined such that the ratio is preferably 10 or more, more preferably 20 or more, particularly preferably 30 or more in terms of obtaining a catalyst with good activity.

In Step (I), the mixing ratio of the compound supplying carbon atom and nitrogen atom to the compound containing iron and/or cobalt is determined such that the ratio (B/M) of the substance amount of nitrogen contained in both the compounds, B mol, to the total of the substance amount of iron and the substance amount of cobalt that are contained in both the compounds, M mol, is preferably 200 or less, more preferably 150 or less, particularly preferably 120 or less, and is determined such that the ratio is preferably 20 or more, more preferably 30 or more, particularly preferably 40 or more, in terms of obtaining a catalyst with good activity.

The solvent in Step (I) is used in an amount sufficient to knead or dissolve the raw materials.

When the catalyst precursor solution is prepared, it is preferred to use a precipitation suppressant so that the concentration of the precipitation suppressant in the catalyst precursor solution is 1 to 20% by mass, preferably 1 to 10% by mass. The precipitation suppressant at this time is preferably a ketone, an alcohol or an ether, particularly preferably a compound having a diketone structure. Acetylacetone, dimedone and the like, which are 1,3-diketone, are particularly preferable. Using such a precipitation suppressant prevents the occurrence of a precipitate derived from a compound containing iron and/or cobalt, and leads to the stable production of a reaction product between the compound containing iron and/or cobalt and the compound supplying carbon and nitrogen.

The precipitation suppressant may be used as a solvent, and may be added singly. When the precipitation suppressant is used in procedure (ii), a preferable method is that a precipitation suppressant is added to the raw material compound solution of the compound containing iron and/or cobalt, or that a precipitation suppressant is used as a solvent.

The mixing procedure in Step (I) is performed preferably with stirring in order to increase the dissolution rate of each component in a solvent. It is also preferred that the whole amount is not mixed at a time. The mixing method is not particularly limited as long as being a method by which these compounds can be uniformly mixed. Exemplary methods include a method using rotary shear flow or a method using ultrasonic wave.

When the catalyst precursor solution is prepared, the use of an acid for controlling the pH of the catalyst precursor solution to be not more than 4 is preferable, more preferably to be not more than 3.5. By controlling the pH of the catalyst precursor solution in this way, the hydrolysis and precipitation can be more efficiently prevented. A pH value in the present invention is indicated as a value at 25° C.

The acids to be used may be the ones mentioned above. Preferred is an organic acid. Specific examples thereof include acetic acid, propionic acid and methanesulfonic acid. Of these, acetic acid is particularly preferable, which can be removed as a solvent in Step (II) described later and can be handled easily.

In Step (II), from the catalyst precursor solution obtained in Step (I), the solvent is removed to prepare a catalyst precursor.

The solvent removal may be performed in air, or under an inert gas (for example, a nitrogen gas, an argon gas, a helium gas or the like) atmosphere at a solvent removal temperature. The inert gas is preferably a nitrogen gas and an argon gas, more preferably a nitrogen gas, in terms of cost.

The temperature in solvent removal preferably ranges from the lower limit temperature to the upper limit temperature described as follows. The lower limit temperature may be ordinary temperature when the vapor pressure of a solvent is large, but from the viewpoint of mass production of the catalyst, the lower limit temperature is preferably 30°

C. or more, more preferably 40° C. or more, further preferably 50° C. or more. The upper limit temperature is preferably 250° C. or less, more preferably 150° C. or less, further preferably 110° C. or less from the viewpoint of preventing the decomposition of the catalyst precursor considered be a metal complex, such as a chelate, contained in the solution obtained in Step 1.

The solvent removal may be performed under atmospheric pressure when the vapor pressure of a solvent is large, but may be performed under reduced pressure (for example, 0.1 Pa to 0.1 MPa) in order to remove the solvent within a shorter period of time. The catalyst precursor solution may be placed still when the solvent is removed, but preferably the catalyst precursor solution may be stirred when the solvent is removed in order to obtain a more uniform sold residue. An exemplary method for removing the solvent with stirring is a method using a rotary vacuum evaporator and spray drying.

Depending on solvent-removal methods or properties of the compound, the catalyst precursor obtained in Step 1 may have a non-uniform composition or be at a non-uniform agglomeration state. In this case, the catalyst precursor may be subjected to mixing and disintegrating to obtain more uniform and finer powders to be used in Step 2, whereby a catalyst can be obtained which has more uniform particle diameter. For the mixing and disintegrating of the catalyst precursor, for example, a ball mill, a mortar, an automatic kneading mortar or the like may be used.

The catalyst precursor may be a single compound, or may be a mixture of multiple compounds. If the catalyst precursor can be dealt with as powders, solvents may be remain therein.

Step 2

In Step 2, the catalyst precursor obtained in Step 1 is heat-treated in a non-oxidizing atmosphere.

The non-oxidizing atmosphere is preferably a gas atmosphere composed of at least one gas atmosphere selected from nitrogen, argon, ammonia and hydrogen cyanide, or a mixed gas atmosphere composed of at least one gas atmosphere selected from nitrogen, argon, ammonia and hydrogen cyanide together with at least one gas selected from hydrogen, methane, propane, butane and carbon monoxide. The atmosphere composed of at least one gas atmosphere selected from nitrogen, argon, ammonia and hydrogen cyanide is preferable, in terms of preventing more oxidization than necessary on the catalyst and stabilizing the composition. The mixed gas atmosphere composed of at least one gas selected from nitrogen, argon, ammonia and hydrogen cyanide together with at least one gas selected from hydrogen, methane, propane, butane and carbon monoxide is preferable in terms of efficiently preventing more oxidization than necessary on the catalyst. Of these, the argon gas atmosphere is particularly preferable in term of obtaining a catalyst with high activity.

When the mixed gas is used, the mixing proportion in the mixed gas of at least one gas selected from hydrogen, methane, propane, butane and carbon monoxide is 1 to 5 vol %.

The pressure of the gas atmosphere is not particularly limited, and the heat treatment may be performed under atmospheric pressure from the viewpoints such as production stability and cost. Even under this condition, a preferable oxygen reducing catalyst can be obtained.

Examples of the heat treatment method include standing method (for example, a method using an electric furnace), a stirring method (for example, a method using a rotary kiln), dropping method, powder capturing method. When a catalyst with particularly high catalyst activity is desired, the heat treatment is conducted preferably by using electric furnaces employing electric heaters as a heat source, which can perform precise temperature control.

The heat treat temperature and the heating rate vary depending on which heat treatment method to use.

When the standing method and the stirring method are adopted, the heat treatment temperature of the catalyst precursor preferably ranges from 800 to 1100° C., more preferably from 850 to 1100° C. The heat treatment temperature falling within the above range is adequate for the generation of catalyst activity sites, and is preferable in terms of preventing the catalyst from undergoing sintering.

The heating rate at the time of heating to the heat treatment temperature is preferably 10 to 40° C./min, more preferably 15 to 25° C./min. The heating rate being within the above range is advantageous in terms of maximizing the BET specific surface area of the resultant oxygen reducing catalyst.

The retention time after temperature increase is preferably 10 minutes to 5 hours, more preferably 15 to 120 minutes, since the retention time too long causes particle growth, sintering or the like, which lowers the catalytic performance, and is disadvantageous in terms of cost.

After the heat treatment, a heat-treated product may be disintegrated. Performing the disintegrating may improve the processability in using the resultant electrode catalyst to produce an electrode, and the properties of the resultant electrode. For the disintegrating, for example, a ball mill, small-diameter ball mill, a mortar, an automatic kneading mortar, or a jet mill may be used.

<Oxygen Reducing Catalyst>

The oxygen reducing catalyst of the present invention is produced by the above process for producing an oxygen reducing catalyst of the present invention.

The oxygen reducing catalyst obtained by the production process contains at least one of iron and cobalt as a metal element. The oxygen reducing catalyst of the present invention may contain a metal element other than iron and cobalt, but without containing any noble metals, adequately functions as a catalyst alternative to noble metals, or without containing titanium, adequately functions as a titanium-free catalyst.

The oxygen reducing catalyst according to a preferred embodiment of the present invention contains iron as a metal element, which has particularly high activity.

In a preferable embodiment, the proportion of the total atomic number of iron and cobalt, the atomic number of carbon, the atomic number of nitrogen and the atomic number of oxygen, which constitute the oxygen reducing catalyst, is (iron and cobalt):carbon:nitrogen:oxygen=1:x:y:z, wherein $10 \leq x \leq 65$, $0 < y \leq 2$ and $0 < z \leq 20$.

In terms of providing an oxygen reducing catalyst with high activity, the range of x is more preferably $20 \leq x \leq 50$, particularly preferably $35 \leq x \leq 45$; the range of y is more preferably $0.1 \leq y \leq 1.5$, particularly preferably $0.3 \leq y \leq 1.2$; and the range of "z" is more preferably $0.3 \leq z \leq 8$, particularly preferably $1 \leq z \leq 7$.

The values of x, y and z are values as measured by the method adopted in Examples described later.

An example of the metal element other than iron and cobalt that may be contained in the oxygen reducing catalyst of the present invention is nickel.

The oxygen reducing catalyst of the present invention preferably has at least one of iron and cobalt atoms, as well as carbon, nitrogen and oxygen atoms, and has a crystalline structure of an oxide, a carbide or a nitride of at least one of iron and cobalt, or a plurality of crystalline structures of these. The results of the study of the crystalline structures by X-ray diffraction analysis and the elemental analysis of the catalyst lead to the presumption that the catalyst has an oxide structure of at least one of iron and cobalt with the site of the oxygen atom of the oxide structure being substituted with a carbon atom or nitrogen atom; or has a carbide, nitride or carbonitride structure of at least one of iron and cobalt with the site of the carbon atom or the nitrogen atom being substituted with an oxygen atom; or has a mixture containing these structures.

According to the process for producing an oxygen reducing catalyst of the present invention, an oxygen reducing catalyst having a large specific surface area is produced without conducting a vigorous disintegrating treatment, such as a treatment using a planetary ball mill, after the heat treatment. The catalyst of the present invention preferably has a specific surface area as calculated by BET method of 150 $m^2/g$ or more, more preferably 150 to 700 $m^2/g$, still more preferably 200 to 700 $m^2/g$.

Where the above oxygen reducing catalyst is used as a fuel cell electrode catalyst, when an electrode described below is employed, the oxygen reduction onset potential as measured in accordance with the evaluation of oxygen reducing ability of the catalyst is 0.5 V (vs. RHE) or more, as measured versus a reversible hydrogen electrode.

Evaluation of oxygen reducing ability of catalyst when an electrode is employed:
(Preparation of Electrode)

The catalyst in an amount of 30 mg and carbon in an amount of 7.5 mg are put in 1.2 ml of a solvent, and stirred using ultrasonic wave, to prepare a suspension. As the carbon, carbon black (specific surface area: 100 to 900 $m^2/g$) (e.g., KetjenBlack (registered trademark) EC-600JD, manufactured by Lion Corporation) is used. As the solvent, isopropyl alcohol:water (mass ratio)=1:1 is used.

To the suspension, a 5% NAFION (registered trademark) solution (DE521 manufactured by DuPont) in an amount of 37.5 μl is added, and these are mixed. While mixing the suspension, a 10 μL portion thereof is collected and is quickly dropped on a glassy carbon electrode (diameter: 5.2 mm) and dried at 120° C. for 5 minutes to form a fuel cell catalyst layer containing the catalyst on the glassy carbon electrode. This dropping and drying operation is performed until 1.0 mg or more of the fuel cell catalyst layer is formed on the carbon electrode surface.
(Measurement of Current-Potential Curve and Calculation Method of Oxygen Reduction Current Density)

The electrode thus obtained is polarized in an aqueous 0.5 mol/L sulfuric acid solution at 30° C. under an oxygen atmosphere and under a nitrogen atmosphere at a potential scanning rate of 5 mV/sec, thereby measuring a current-potential curve. As a reference electrode, a reversible hydrogen electrode is used in an aqueous sulfuric acid solution of the same concentration.

In the present invention, oxygen reduction current density can be determined in the following manner.

At first, from a current-potential curve under an oxygen atmosphere and a current-potential curve under a nitrogen atmosphere that were obtained in the evaluation of a single electrode of the catalyst, a difference between a reduction current under an oxygen atmosphere and a reduction current under a nitrogen atmosphere at a specific potential (e.g., 0.75 V (vs. RHE)) is calculated. The calculated value is divided by an area of the electrode to provide a value and this value is defined as an oxygen reduction current density (mA/$cm^2$).

<Uses>

The catalyst of the present invention can be used as a catalyst alternative to platinum catalysts. Thus, the oxygen reducing catalyst of the present invention can be used as a fuel cell electrode catalyst or as an air cell electrode catalyst.

The fuel cell of the present invention is a fuel cell of sold polymer type (PEFC) and comprises a membrane-electrode assembly described later. As a fuel, hydrogen and an alcohol such as methanol and ethanol can be used. Hydrogen may be used under ordinary pressure or under increased pressure. Alcohol may be used as it is, or may be used in the form of an aqueous solution. Oxygen source may be oxygen or may be air, and may be used under ordinary pressure or increased pressure. Air may be used at a higher concentration by using oxygen enriching membrane.

The fuel cell comprising the catalyst of the present invention has high performance and is considerably inexpensive as compared with fuel cells using platinum as a catalyst. The fuel cell of the present invention has at least one function selected from the group consisting of electricity generating function, light emitting function, heat generating function, sound generating function, movement function, display function, and charging function, and can improve the performance of an article having a fuel cell. The fuel cell is held preferably on the surface or inside of the article.

The catalyst has excellent durability and has a large oxygen reducing ability, and thus is preferably used for a cathode catalyst layer. The fuel cell catalyst layer of the present invention comprises the catalyst.

The fuel cell catalyst layer of the present invention comprises the catalyst having high oxygen reducing ability and is resistant to corrosion in acidic electrolytes even at high potential and is therefore useful as a catalyst layer provided in a cathode of a fuel cell (as a cathode catalyst layer). In particular, the catalyst layer is preferably provided in a cathode of a membrane electrode assembly in a polymer electrolyte fuel cell.

The fuel cell catalyst layer of the present invention according to a preferable embodiment further comprises electron conductive particles. When the fuel cell catalyst layer comprising the catalyst further comprises the electron conductive particles, the reduction current can be more increased. It is considered that the electron conductive particles increase the reduction current because of allowing the catalyst to have an electrical bond for inducing electrochemical reaction.

Examples of materials of the electron conductive particles include carbon, conductive polymers, conductive ceramics, metals, and conductive inorganic oxides such as tungsten oxide and iridium oxide, and these materials can be used singly or in combination with one another. In particular, electron conductive particles composed of carbon have a large specific surface area, and those having a small particle diameter are easily available inexpensively, and they are excellent in chemical resistance and high-potential resistance. That is, the fuel cell catalyst layer preferably comprises the catalyst and carbon.

Examples of the carbon include carbon black, graphite, activated carbon, carbon nanotube, carbon nanofiber, carbon nanohorn, fullerene, porous carbon and graphene. If the particle diameter of the electron conductive particles composed of carbon is excessively small, an electron conductive path is not readily formed, while if the particle diameter is excessively large, the fuel cell catalyst layer tends to have decreased gas diffusion properties or the catalyst usage rate tends to be lowered, and therefore, the particle diameter of the electron conductive particles composed of carbon is preferably 10 to 1000 nm, more preferably 10 to 100 nm.

When the electron conductive particles are composed of carbon, the mass ratio of the catalyst to the electron conductive particles (catalyst:electron conductive particles) is preferably 1:1 to 1:0.01.

The conductive polymers are not particularly limited but examples thereof include polyacetylene, poly-p-phenylene, polyaniline, polyalkylaniline, polypyrrole, polythiophene, polyindole, poly-1,5-diaminoanthraquinone, polyaminodiphenyl, poly(o-phenylenediamine), poly(quinolinium) salt, polypyridine, polyquinoxaline, polyphenylquinoxaline and derivatives thereof. Of these, polypyrrole, polyaniline, and polythiophene are preferred, and polypyrrole is more preferred. These conductive polymers man contain a dopant in order to attain high conductivity.

The fuel cell catalyst layer of the present invention according to a preferable embodiment further comprises a polymer electrolyte. The polymer electrolyte is not particularly limited as long as being the one commonly used in fuel cell catalyst layers. Specific examples thereof include perfluorocarbon polymers having a sulfonic acid group (such as NAFION (registered trademark)), hydrocarbon polymer compounds having a sulfonic acid group, polymer compounds doped with inorganic acids such as a phosphoric acid, organic/inorganic hybrid polymers partially substituted with proton conductive functional groups, and proton conductors composed of a polymer matrix impregnated with a phosphoric acid solution or a sulfuric acid solution. Of these, a copolymer of tetrafluoroethylene and perfluoro[2-(fluorosulfonylethoxy)propylvinyl ether] is preferable. An exemplary source of this copolymer used to form the above fuel cell catalyst layer is a 5% NAFION (registered trademark) solution (DE521, DuPont).

The fuel cell catalyst layer of the present invention may be used as an anode catalyst layer or a cathode catalyst layer.

The fuel cell catalyst layer may be formed by any methods without limitation. For example, a suspension containing the above catalyst, the electron conductive particles, and the electrolyte may be applied to an electrolyte membrane or a gas diffusion layer as described later. The application methods include dipping, screen printing, roll coating, spraying and bar coating. In another embodiment, a suspension containing the above catalyst, the electron conductive particles, and the electrolyte may be applied or filtered on a substrate to form a fuel cell catalyst layer, and the catalyst layer may be transferred to an electrolyte membrane.

The electrode of the present invention comprises the above fuel cell catalyst layer and a porous support layer.

The electrode of the present invention has excellent durability and high catalytic performance, and therefore the use thereof as a cathode leads to higher industrial advantage.

The porous support layer is a layer which diffuses gas (hereinafter also referred to as the "gas diffusion layer"). The gas diffusion layer is not limited as long as having electron conductivity, high gas diffusion properties, and high corrosion resistance. Carbon-based porous materials such as carbon paper and carbon cloth, and stainless steel and anticorrosive-coated aluminum foils for weight reduction are generally used as the gas diffusion layer.

The membrane electrode assembly of the present invention comprises a cathode, an anode, and an electrolyte membrane interposed between the cathode and the anode, wherein the cathode and/or the anode is the above electrode.

As the electrolyte membranes, perfluorosulfonic acid-based electrolyte membranes or hydrocarbon electrolyte membranes are generally used, and there may also be used membranes in which polymer microporous membranes are impregnated with liquid electrolyte; membranes in which porous bodies are filled with polymer electrolyte; or the like.

<Specific Examples of Articles Comprising Fuel Cell of the Present Invention>

Specific examples of the articles comprising the fuel cell of the present invention include architectural structures such as buildings, houses and tents, illumination equipment such as fluorescent light, LED, organic EL, street light, interior illumination and traffic light, machinery, automotive devices including vehicles, household appliances, agricultural equipment, electronic devices, mobile information terminals including mobile phones, beauty instruments, portable tools, sanitary goods such as bathroom goods and lavatory goods, furniture, toys, ornaments, bulletin boards, cool boxes, outdoor goods such as exterior electricity generators, teaching materials, artificial flowers, items of artwork, power source for cardiac pacemakers and power source for heating and cooling apparatuses equipped with Peltier elements.

EXAMPLES

The present invention will be described below based on examples but the present invention is not limited to these examples.

In Examples and Comparative Examples, various measurements were performed by the following methods.

[Analytical Methods]

1. Elemental Analysis

Carbon: About 0.1 g of a sample was weighed and measured with EMIA-110 manufactured by HORIBA, Ltd.

Nitrogen/Oxygen: About 0.1 g of a sample was weighed, was sealed in a Ni capsule, and was measured with an oxygen/nitrogen analyzer.

Transition Metal Element: About 0.1 g of a sample was weighed in a platinum plate, and after the addition of an acid, was heat decomposed. This heat decomposed product was collected to a constant volume, and diluted and quantitated by ICP-MS.

2. Powder X-Ray Diffractometry

Samples were subjected to powder X-ray diffractometry using Rotaflex manufactured by Rigaku Corporation.

3. BET Specific Surface Area Measurement 0.15 g of a sample was collected, and its specific surface area was measured by using a full-automatic BET specific surface area measurement instrument Macsorb (manufactured by Mountec Co., Ltd.). The pre-treatment time was set at 30 minutes and the pre-treatment temperature was set at 200° C.

4. Evaluation of Oxygen Reducing Ability of Catalyst Using Electrode (1) Preparation of Electrode 30 mg of the resultant catalyst and 7.5 mg of carbon black (KetjenBlack EC-600JD, manufactured by Lion Corporation) were introduced to 1.2 ml of a solution prepared by mixing isopropyl alcohol and pure water at a mass ratio of 1:1, and these were dispersed and mixed by the application of ultrasonic wave. To this suspension, 37.5 μl of a 5% NAFION (registered trademark) solution (DE521, manufactured by DuPont) was added, and these were further mixed.

While mixing the suspension, a 10 μL portion thereof was collected and was quickly dropped on a glassy carbon electrode (diameter: 5.2 mm) and dried at 120° C. for 5 minutes to form a fuel cell catalyst layer containing the catalyst on the glassy carbon electrode. This dropping and drying operation was performed until 1.0 mg or more of the fuel cell catalyst layer was formed on the carbon electrode surface.

(2) Evaluation of Oxygen Reducing Ability

The electrode prepared in the above (1) was polarized in an aqueous 0.5 mol/L sulfuric acid solution at 30° C. under an oxygen atmosphere and under a nitrogen atmosphere at a potential scanning rate of 5 mV/sec, thereby measuring a current-potential curve. At this time, as a reference electrode, a reversible hydrogen electrode was used in an aqueous sulfuric acid solution of the same concentration.

In the measurement results of the current-potential curve, a difference between a reduction current under an oxygen atmosphere and a reduction current under a nitrogen atmosphere at 0.75 V (vs. RHE) was calculated, and the calculated value was divided by an electrode area to give a value, which was defined as an oxygen reduction current density (mA/cm$^2$). From this oxygen reduction current density, the catalytic performance of the fuel cell electrode prepared was evaluated.

That is, the larger the oxygen reduction current density is, the higher the catalytic performance of a catalyst in a fuel cell electrode is.

Example 1

10.043 g of glycine and 0.582 g of iron acetate were weighed and dissolved in 120 ml of water to obtain an aqueous solution. To 5.118 ml of acetylacetone, 32 ml of acetic acid was added to obtain a mixed liquid. The mixed liquid was added to the aqueous solution, and these were sufficiently stirred. The resultant solution had pH of 3.3. The resultant solution was treated at 60° C. on a water bath with an evaporator, to be dried. The resultant solid substance was crushed with a mortar. This crushed product was introduced to a quartz tubular furnace. The furnace was filled with a mixed gas atmosphere of a hydrogen gas and a nitrogen gas containing 4 vol % of a hydrogen gas. The temperature in the furnace was increased to 900° C. at a heating rate of 20° C./min, and was retained for 60 minutes, whereby the crushed product was heat-treated. Thereafter, the product was allowed to cool, and an iron oxycarbonitride was obtained. The resultant iron oxycarbonitride was crushed with a mortar to provide a sample powder (hereinafter referred to as the "catalyst (1)".).

The powder X-ray diffraction spectrum of the catalyst (1) is shown in FIG. 1.

The result of the elemental analysis of the catalyst (1) is shown in Table 1. The proportion of the atomic number of iron, the atomic number of carbon, the atomic number of nitrogen and the atomic number of oxygen is represented by iron:carbon:nitrogen:oxygen=1:x:y:z. The values x, y and z are shown in Table 1.

Figure 2:
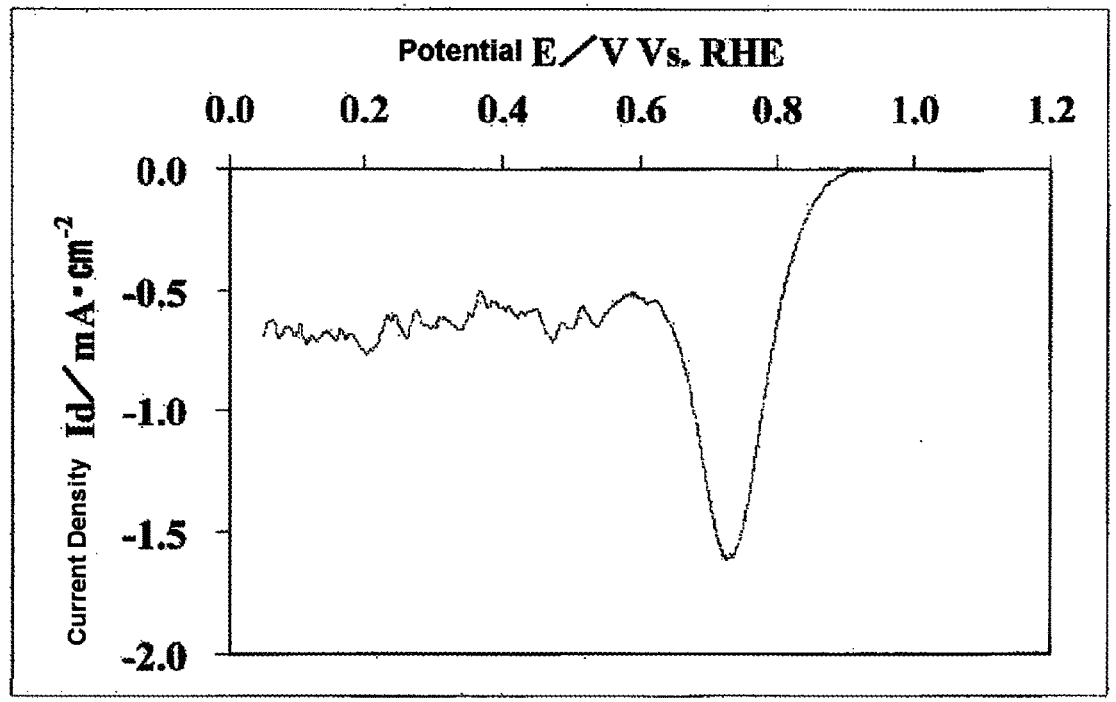
FIG. 2 shows a current-potential curve that evaluates the oxygen reducing ability of fuel cell electrode (1).

FIG. 2 shows a current-potential curve obtained in the evaluation of the oxygen reducing ability.

Regarding the catalyst (1), the oxygen reduction current density obtained in the evaluation of the oxygen reducing ability and the BET specific surface area are shown in Table 1. From this oxygen reduction current density, the catalyst (1) was found to have high catalytic performance. The electrode used in this evaluation was defined as a fuel cell electrode (1).

Example 2

By the same operation as in Example 1 except that 10.043 g of glycine was replaced by 11.919 g of alanine, a sample powder (hereinafter referred to as the "catalyst (2)".) was obtained. The catalyst precursor solution had pH of 3.2.

The result of the elemental analysis of the catalyst (2) is shown in Table 1. The proportion of the atomic number of iron, the atomic number of carbon, the atomic number of nitrogen and the atomic number of oxygen is represented by iron:carbon:nitrogen:oxygen=1:x:y:z. The values x, y and z are shown in Table 1.

Regarding the catalyst (2), the oxygen reduction current density obtained in the evaluation of the oxygen reducing ability and the BET specific surface area are shown in Table 1. From this oxygen reduction current density, the catalyst (2) was found to have high catalytic performance. The electrode used in this evaluation was defined as a fuel cell electrode (2).

Example 3

By the same operation as in Example 1 except that 10.043 g of glycine was replaced by 8.838 g of glycylglycine, a sample powder (hereinafter referred to as the "catalyst (3)".) was obtained. The catalyst precursor solution had pH of 3.3.

Regarding the catalyst (3), the oxygen reduction current density obtained in the evaluation of the oxygen reducing ability and the BET specific surface area are shown in Table 1. From this oxygen reduction current density, the catalyst (3) was found to have high catalytic performance. The electrode used in this evaluation was defined as a fuel cell electrode (3).

Example 4

By the same operation as in Example 1 except that 10.043 g of glycine was replaced by 14.869 g of polyvinylpyrrolidone, a sample powder (hereinafter referred to as the "catalyst (4)".) was obtained. The catalyst precursor solution had pH of 3.4.

Regarding the catalyst (4), the oxygen reduction current density obtained in the evaluation of the oxygen reducing ability and the BET specific surface area are shown in Table 1. From this oxygen reduction current density, the catalyst (4) was found to have high catalytic performance. The electrode used in this evaluation was defined as a fuel cell electrode (4).

Example 5

By the same operation as in Example 1 except that 10.043 g of glycine was replaced by 8.93 ml of ethylenediamine, a sample powder (hereinafter referred to as the "catalyst (5)".) was obtained. The catalyst precursor solution had pH of 3.3.

Regarding the catalyst (5), the oxygen reduction current density obtained in the evaluation of the oxygen reducing ability and the BET specific surface area are shown in Table 1. From this oxygen reduction current density, the catalyst (5) was found to have high catalytic performance. The electrode used in this evaluation was defined as a fuel cell electrode (5).

Example 6

By the same operation as in Example 1 except that 0.582 g of iron acetate was replaced by 1.039 g of hexacyano iron(II) ammonium n-hydrate (manufactured by Wako Pure Chemical Industries, Ltd.), a sample powder (hereinafter referred to as the "catalyst (6)".) was obtained. The catalyst precursor solution had pH of 3.7.

The result of the elemental analysis of the catalyst (6) is shown in Table 2. The proportion of the atomic number of iron, the atomic number of carbon, the atomic number of nitrogen and the atomic number of oxygen is represented by iron:carbon:nitrogen:oxygen=1:x:y:z. The values x, y and z are shown in Table 2.

Regarding the catalyst (6), the oxygen reduction current density obtained in the evaluation of the oxygen reducing ability and the BET specific surface area are shown in Table 2. From this oxygen reduction current density, the catalyst (6) was found to have high catalytic performance. The electrode used in this evaluation was defined as a fuel cell electrode (6).

Example 7

By the same operation as in Example 1 except that 0.582 g of iron acetate was replaced by 0.621 g of ferrocene, a sample powder (hereinafter referred to as the "catalyst (7)".) was obtained. The catalyst precursor solution had pH of 4.8.

The result of the elemental analysis of the catalyst (7) is shown in Table 2. The proportion of the atomic number of iron, the atomic number of carbon, the atomic number of nitrogen and the atomic number of oxygen is represented by iron:carbon:nitrogen:oxygen=1:x:y:z. The values x, y and z are shown in Table 2.

Regarding the catalyst (7), the oxygen reduction current density obtained in the evaluation of the oxygen reducing ability and the BET specific surface area are shown in Table 2. From this oxygen reduction current density, the catalyst (7) was found to have high catalytic performance. The electrode used in this evaluation was defined as a fuel cell electrode (7).

The results of Example 1 are also shown in Table 2.

Example 8

By the same operation as in Example 1 except that 0.582 g of iron acetate was replaced by 0.832 g of cobalt acetate tetrahydrate, a sample powder (hereinafter referred to as the "catalyst (8)".) was obtained. The catalyst precursor solution had pH of 3.4.

The result of the elemental analysis of the catalyst (8) is shown in Table 3.

In Table 3, regarding Examples 8 to 10 and Comparative Example 1, the proportion of the atomic number of iron, the atomic number of cobalt, the atomic number of a metal element other than iron and cobalt, the atomic number of carbon, the atomic number of nitrogen and the atomic number of oxygen is represented by iron:cobalt:a metal element other than iron and cobalt:carbon:nitrogen:oxygen=a:b:c:x:y:z, wherein a+b=1, and when a and b are 0, c is 1. The values a, b, c, x, y and z are shown in Table 3.

Regarding the catalyst (8), the oxygen reduction current density obtained in the evaluation of the oxygen reducing ability and the BET specific surface area are shown in Table 3. From this oxygen reduction current density, the catalyst (8) was found to have high catalytic performance. The electrode used in this evaluation was defined as a fuel cell electrode (8).

Example 9

By the same operation as in Example 1 except that 0.582 g of iron acetate was replaced by 0.290 g of iron acetate and 0.416 g of cobalt acetate tetrahydrate, a sample powder (hereinafter referred to as the "catalyst (9)".) was obtained. The catalyst precursor solution had pH of 3.4.

Regarding the catalyst (9), the results of the elemental analysis, the oxygen reduction current density and the BET specific surface area are shown in Table 3.

From this oxygen reduction current density, the catalyst (9) was found to have high catalytic performance. The electrode used in this evaluation was defined as a fuel cell electrode (9).

Example 10

By the same operation as in Example 1 except that 0.582 g of iron acetate was replaced by 0.290 g of iron acetate and 0.416 g of nickel acetate tetrahydrate, a sample powder (hereinafter referred to as the "catalyst (10)".) was obtained. The catalyst precursor solution had pH of 3.4.

Regarding the catalyst (10), the results of the elemental analysis, the oxygen reduction current density and the BET specific surface area are shown in Table 3.

From this oxygen reduction current density, the catalyst (10) was found to have high catalytic performance. The electrode used in this evaluation was defined as a fuel cell electrode (10).

Comparative Example 1

By the same operation as in Example 1 except that 0.582 g of iron acetate was replaced by 0.831 g of nickel acetate tetrahydrate, a sample powder (hereinafter referred to as the "catalyst (11)".) was obtained. The catalyst precursor solution had pH of 3.4.

Regarding the catalyst (11), the results of the elemental analysis, the oxygen reduction current density and the BET specific surface area are shown in Table 3.

Regarding the catalyst (11), the oxygen reduction current density obtained in the evaluation of the oxygen reducing ability and the BET specific surface area are shown in Table 3. The electrode used in this evaluation was defined as a fuel cell electrode (11).

The results of Example 1 are also shown in Table 3.

Example 11

By the same operation as in Example 1 except that 32 ml of acetic acid was replaced by 128 ml of acetic acid, a sample powder (hereinafter referred to as the "catalyst (12)".) was obtained. The catalyst precursor solution had pH of 2.6.

Regarding the catalyst (12), the oxygen reduction current density obtained in the evaluation of the oxygen reducing ability and the BET specific surface area are shown in Table 4. From this oxygen reduction current density, the catalyst (12) was found to have high catalytic performance. The electrode used in this evaluation was defined as a fuel cell electrode (12).

Example 12

By the same operation as in Example 1 except that 32 ml of acetic acid was replaced by 96 ml of acetic acid, a sample powder (hereinafter referred to as the "catalyst (13)".) was obtained. The catalyst precursor solution had pH of 2.8.

Regarding the catalyst (13), the oxygen reduction current density obtained in the evaluation of the oxygen reducing ability and the BET specific surface area are shown in Table 4. From this oxygen reduction current density, the catalyst

(13) was found to have high catalytic performance. The electrode used in this evaluation was defined as a fuel cell electrode (13).

Example 13

By the same operation as in Example 1 except that 32 ml of acetic acid was replaced by 64 ml of acetic acid, a sample powder (hereinafter referred to as the "catalyst (14)".) was obtained. The catalyst precursor solution had pH of 3.1.

Regarding the catalyst (14), the oxygen reduction current density obtained in the evaluation of the oxygen reducing ability and the BET specific surface area are shown in Table 4. From this oxygen reduction current density, the catalyst (14) was found to have high catalytic performance. The electrode used in this evaluation was defined as a fuel cell electrode (14).

Example 14

By the same operation as in Example 1 except that 32 ml of acetic acid was replaced by 16 ml of acetic acid, a sample powder (hereinafter referred to as the "catalyst (15)".) was obtained. The catalyst precursor solution had pH of 3.6.

Regarding the catalyst (15), the oxygen reduction current density obtained in the evaluation of the oxygen reducing ability and the BET specific surface area are shown in Table 4. From this oxygen reduction current density, the catalyst (15) was found to have high catalytic performance. The electrode used in this evaluation was defined as a fuel cell electrode (15).

Example 15

By the same operation as in Example 1 except that acetic acid was not used, a sample powder (hereinafter referred to as the "catalyst (16)".) was obtained. The catalyst precursor solution had pH of 5.0.

Regarding the catalyst (16), the oxygen reduction current density obtained in the evaluation of the oxygen reducing ability and the BET specific surface area are shown in Table 4. From this oxygen reduction current density, the catalyst (16) was found to have high catalytic performance. The electrode used in this evaluation was defined as a fuel cell electrode (16).

The results of Example 1 are also shown in Table 4.

Example 16

By the same operation as in Example 1 except that 32 ml of acetic acid was replaced by 32 ml of methanesulfonic acid, a sample powder (hereinafter referred to as the "catalyst (17)".) was obtained. The catalyst precursor solution had pH of 3.3.

Regarding the catalyst (17), the oxygen reduction current density obtained in the evaluation of the oxygen reducing ability and the BET specific surface area are shown in Table 5. From this oxygen reduction current density, the catalyst (17) was found to have high catalytic performance. The electrode used in this evaluation was defined as a fuel cell electrode (17).

The results of Example 1 are also shown in Table 5.

Example 17

By the same operation as in Example 1 except that acetylacetone was not used, a sample powder (hereinafter referred to as the "catalyst (18)".) was obtained. The catalyst precursor solution had pH of 3.3.

Regarding the catalyst (18), the oxygen reduction current density obtained in the evaluation of the oxygen reducing ability and the BET specific surface area are shown in Table 6. From this oxygen reduction current density, the catalyst (18) was found to have high catalytic performance. The electrode used in this evaluation was defined as a fuel cell electrode (18).

Example 18

By the same operation as in Example 1 except that 5.118 ml of acetylacetone was replaced by 3.4 ml of acetylacetone, a sample powder (hereinafter referred to as the "catalyst (19)".) was obtained. The catalyst precursor solution had pH of 3.3.

Regarding the catalyst (19), the oxygen reduction current density obtained in the evaluation of the oxygen reducing ability and the BET specific surface area are shown in Table 6. From this oxygen reduction current density, the catalyst (19) was found to have high catalytic performance. The electrode used in this evaluation was defined as a fuel cell electrode (19).

Example 19

By the same operation as in Example 1 except that 5.118 ml of acetylacetone was replaced by 6.8 ml of acetylacetone, a sample powder (hereinafter referred to as the "catalyst (20)".) was obtained. The catalyst precursor solution had pH of 3.3.

Regarding the catalyst (20), the oxygen reduction current density obtained in the evaluation of the oxygen reducing ability and the BET specific surface area are shown in Table 6. From this oxygen reduction current density, the catalyst (20) was found to have high catalytic performance. The electrode used in this evaluation was defined as a fuel cell electrode (20).

Example 20

By the same operation as in Example 1 except that 5.118 ml of acetylacetone was replaced by 8.5 ml of acetylacetone, a sample powder (hereinafter referred to as the "catalyst (21)".) was obtained. The catalyst precursor solution had pH of 3.3.

Regarding the catalyst (21), the oxygen reduction current density obtained in the evaluation of the oxygen reducing ability and the BET specific surface area are shown in Table 6. From this oxygen reduction current density, the catalyst (21) was found to have high catalytic performance. The electrode used in this evaluation was defined as a fuel cell electrode (21).

Example 21

By the same operation as in Example 1 except that 5.118 ml of acetylacetone was replaced by 10.2 ml of acetylacetone, a sample powder (hereinafter referred to as the "catalyst (22)".) was obtained.

The catalyst precursor solution had pH of 3.3.

Regarding the catalyst (22), the oxygen reduction current density obtained in the evaluation of the oxygen reducing ability and the BET specific surface area are shown in Table 6. From this oxygen reduction current density, the catalyst

(22) was found to have high catalytic performance. The electrode used in this evaluation was defined as a fuel cell electrode (22).

Example 22

By the same operation as in Example 1 except that 5.118 ml of acetylacetone was replaced by 13.7 ml of acetylacetone, a sample powder (hereinafter referred to as the "catalyst (23)".) was obtained. The catalyst precursor solution had pH of 3.3.

Regarding the catalyst (23), the oxygen reduction current density obtained in the evaluation of the oxygen reducing ability and the BET specific surface area are shown in Table 6. From this oxygen reduction current density, the catalyst (23) was found to have high catalytic performance. The electrode used in this evaluation was defined as a fuel cell electrode (23).

Example 23

By the same operation as in Example 1 except that 5.118 ml of acetylacetone was replaced by 20.5 ml of acetylacetone, a sample powder (hereinafter referred to as the "catalyst (24)".) was obtained.

The catalyst precursor solution had pH of 3.3.

Regarding the catalyst (24), the oxygen reduction current density obtained in the evaluation of the oxygen reducing ability and the BET specific surface area are shown in Table 6. From this oxygen reduction current density, the catalyst (24) was found to have high catalytic performance. The electrode used in this evaluation was defined as a fuel cell electrode (24).

Example 24

By the same operation as in Example 1 except that 5.118 ml of acetylacetone was replaced by 30.7 ml of acetylacetone, a sample powder (hereinafter referred to as the "catalyst (25)".) was obtained.

The catalyst precursor solution had pH of 3.3.

Regarding the catalyst (25), the oxygen reduction current density obtained in the evaluation of the oxygen reducing ability and the BET specific surface area are shown in Table 6. From this oxygen reduction current density, the catalyst (25) was found to have high catalytic performance. The electrode used in this evaluation was defined as a fuel cell electrode (25).

The results of Example 1 are shown in Table 6.

Example 25

By the same operation as in Example 1 except that the furnace was filled with an argon gas atmosphere, a sample powder (hereinafter referred to as the "catalyst (26)".) was obtained.

Regarding the catalyst (26), the oxygen reduction current density obtained in the evaluation of the oxygen reducing ability and the BET specific surface area are shown in Table 7. From this oxygen reduction current density, the catalyst (26) was found to have high catalytic performance. The electrode used in this evaluation was defined as a fuel cell electrode (26).

The results of Example 1 are also shown in Table 7.

Example 26

By the same operation as in Example 1 except that the temperature in the furnace was increased to 700° C., a sample powder (hereinafter referred to as the "catalyst (27)".) was obtained.

Regarding the catalyst (27), the oxygen reduction current density obtained in the evaluation of the oxygen reducing ability and the BET specific surface area are shown in Table 8. From this oxygen reduction current density, the catalyst (27) was found to have high catalytic performance. The electrode used in this evaluation was defined as a fuel cell electrode (27).

Example 27

By the same operation as in Example 1 except that the temperature in the furnace was increased to 800° C., a sample powder (hereinafter referred to as the "catalyst (28)".) was obtained.

Regarding the catalyst (28), the oxygen reduction current density obtained in the evaluation of the oxygen reducing ability and the BET specific surface area are shown in Table 8. From this oxygen reduction current density, the catalyst (28) was found to have high catalytic performance. The electrode used in this evaluation was defined as a fuel cell electrode (28).

Example 28

By the same operation as in Example 1 except that the temperature in the furnace was increased to 1000° C., a sample powder (hereinafter referred to as the "catalyst (29)".) was obtained.

Regarding the catalyst (29), the oxygen reduction current density obtained in the evaluation of the oxygen reducing ability and the BET specific surface area are shown in Table 8. From this oxygen reduction current density, the catalyst (29) was found to have high catalytic performance. The electrode used in this evaluation was defined as a fuel cell electrode (29).

Example 29

By the same operation as in Example 1 except that the temperature in the furnace was increased to 1100° C., a sample powder (hereinafter referred to as the "catalyst (30)".) was obtained.

Regarding the catalyst (30), the oxygen reduction current density obtained in the evaluation of the oxygen reducing ability and the BET specific surface area are shown in Table 8. From this oxygen reduction current density, the catalyst (30) was found to have high catalytic performance. The electrode used in this evaluation was defined as a fuel cell electrode (30).

The results of Example 1 are also shown in Table 8.

Example 30

By the same operation as in Example 1 except that the heating rate was 5° C./min, a sample powder (hereinafter referred to as the "catalyst (31)".) was obtained.

Regarding the catalyst (31), the oxygen reduction current density obtained in the evaluation of the oxygen reducing ability and the BET specific surface area are shown in Table 9. From this oxygen reduction current density, the catalyst (31) was found to have high catalytic performance. The electrode used in this evaluation was defined as a fuel cell electrode (31).

Example 31

By the same operation as in Example 1 except that the heating rate was 40° C./min, a sample powder (hereinafter referred to as the "catalyst (32)".) was obtained.

Regarding the catalyst (32), the oxygen reduction current density obtained in the evaluation of the oxygen reducing ability and the BET specific surface area are shown in Table 9. From this oxygen reduction current density, the catalyst (32) was found to have high catalytic performance. The electrode used in this evaluation was defined as a fuel cell electrode (32).

Example 32

By the same operation as in Example 1 except that the heating rate was 60° C./min, a sample powder (hereinafter referred to as the "catalyst (33)".) was obtained.

Regarding the catalyst (33), the oxygen reduction current density obtained in the evaluation of the oxygen reducing ability and the BET specific surface area are shown in Table 9. From this oxygen reduction current density, the catalyst (33) was found to have high catalytic performance. The electrode used in this evaluation was defined as a fuel cell electrode (33).

The results of Example 1 are also shown in Table 9.

Comparative Example 2

10.043 g of glycine was weighed and had 120 ml of water added thereto and dissolved to provide an aqueous solution. To 5.118 ml of acetylacetone, 10 ml of titanium (IV) isopropoxide was added, and further 32 ml of acetic acid was added to obtain a mixed liquid. The mixed liquid was added to the water solution, and these were stirred. The resultant solution had pH of 3.3. The resultant solution was treated at 60° C. on a water bath with an evaporator, to be dried. The resultant solid substance was crushed with a mortar. This crushed product was introduced to a quartz tubular furnace, and the furnace was filled with a mixed gas atmosphere of a hydrogen gas and a nitrogen gas containing 4 vol % of a hydrogen gas. The temperature in the furnace was increased at a heating rate of 20° C./min to 900° C., and was retained for 60 minutes, whereby the crushed product was heat-treated. Thereafter, the product was allowed to cool, and an iron oxycarbonitride was obtained. The resultant iron oxycarbonitride was crushed with a mortar, to obtain a sample powder (hereinafter referred to as the "catalyst (34)".).

Figure 3:
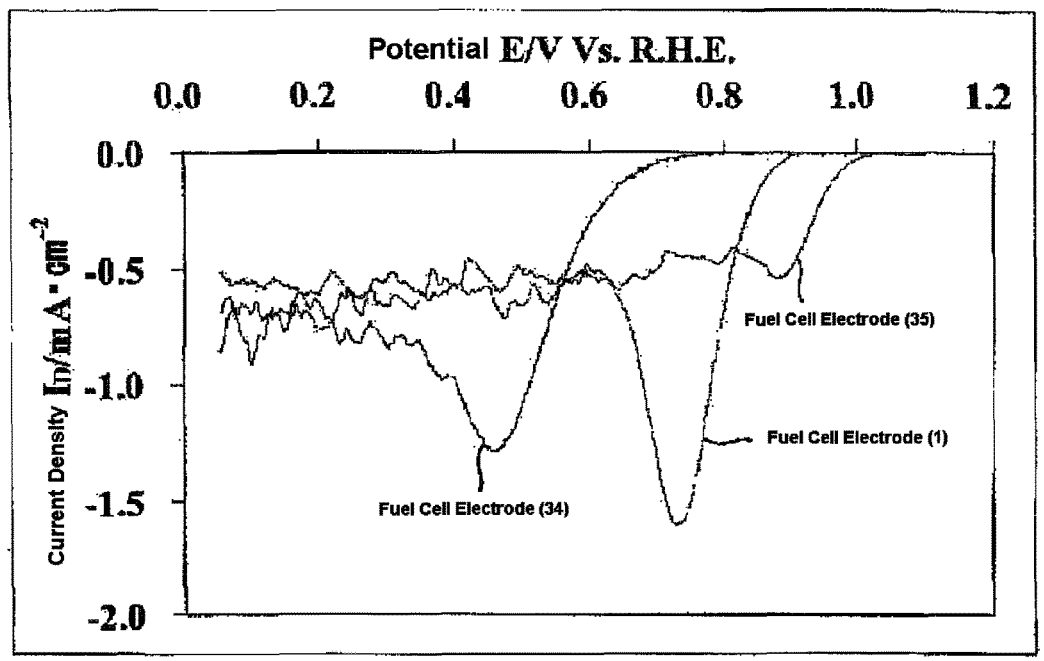
FIG. 3 shows current-potential curves that evaluate the oxygen reducing abilities of a fuel cell electrode (1), a fuel cell electrode (34) and a fuel cell electrode (35).

FIG. 3 shows a current-potential curve obtained in the evaluation of oxygen reducing ability. The electrode used in this evaluation was defined as a fuel cell electrode (34).

Comparative Example 3

A commercially available catalyst in which platinum in an amount of 64.7% was supported on carbon was used for the evaluation of oxygen reducing ability, and a current-potential curve was obtained. The current-potential curve obtained is shown in FIG. 3. The electrode used in this evaluation was defined as a fuel cell electrode (35).

The current-potential curve obtained in Example 1 is shown in FIG. 3.

Comparative Example 4

Catalyst Having Carbon/Nitrogen as Main Components 10 g of a phenol resin (manufactured by Gunei Chemical Industry Co., Ltd.) was stirred and dissolved in 50 ml of acetone. To the resultant solution, 50 mg of chloroacetic acid (manufactured by Tokyo Chemical Industry Co., Ltd.) and 300 mg of phthalocyanine iron (manufactured by Tokyo Chemical Industry Co., Ltd.) were added. The resultant solution was introduced to an ultrasonic wave washing device, and was shaken for 1 hour. After the liquid color turned from purple to blue-green, this solution was concentrated with an evaporator, and the concentrated solution was dried in nitrogen stream at 80° C. for 24 hours. A precursor was thus synthesized in an amount of 8.23 g.

4.8 g of this precursor was introduced to a quartz tubular furnace, and in nitrogen stream, the temperature in the furnace was increased at a heating rate of 150° C./hr, and was retained at 600° C. for 1 hour. As a result thereof, 2.44 g of a carbonized sintered product was obtained. This sintered product in an amount of 2.00 g was stirred and washed with 500 ml of strong hydrochloric acid for 24 hours, followed by filtration. Then, washing with distilled water was carried out until the filtrate became neutral. An acid-washed product in an amount of 1.95 g was obtained. The acid-washed product in an amount of 1.00 g was introduced to a quartz tubular furnace, and in ammonia gas stream, the temperature in the furnace was increased at a heating rate of 100° C./hr, and was retained at 800° C. for 80 minutes, and thereby heat treatment was carried out. Thereafter, the heat-treated product was allowed to cool, and 0.56 g of a carbon alloy containing carbon and nitrogen as main components was obtained. The resultant carbon alloy was crushed with a mortar, to obtain a sample powder (hereinafter referred to as the "catalyst (36)".).

The catalyst (36) had a BET specific surface area of 462 $m^2/g$. The oxygen reduction current density of the catalyst (36) obtained in the evaluation of the oxygen reducing ability was 0.10 $mA/cm^2$ at 0.75 V Vs. RHE. The catalyst (36) had a larger BET specific surface area but a lowered oxygen reducing ability than Examples.

Figure 4:
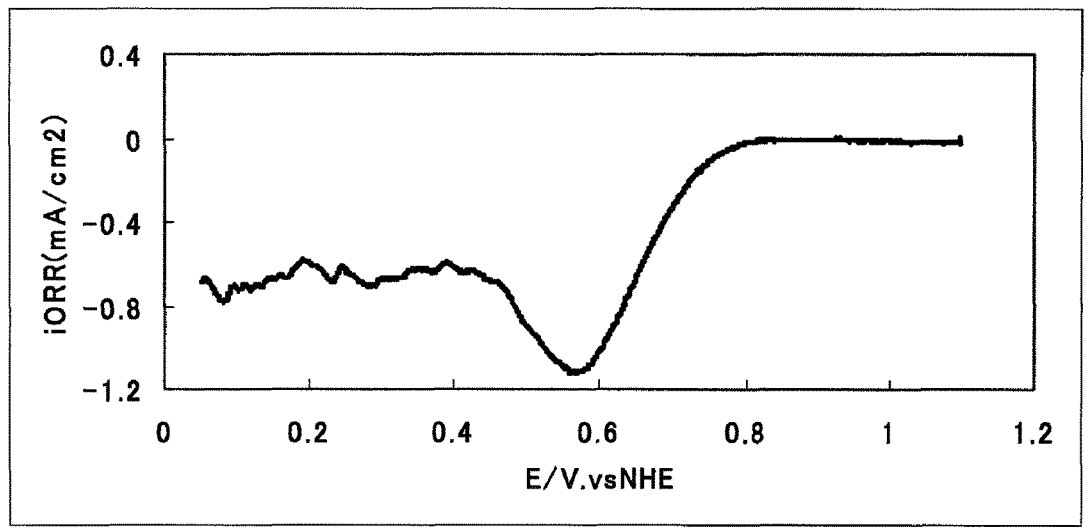
FIG. 4 shows a current-potential curve that evaluates the oxygen reducing ability of fuel cell electrode (36).

The current-potential curve obtained is shown in FIG. 4.

TABLE 1

| | Compound Supplying Nitrogen | Oxygen Reduction Current Density ($mA/cm^2$) at 0.75 V Vs. RHE) | BET Specific Surface Area ($m^2/g$) | Elemental Analysis | | |
|---|---|---|---|---|---|---|
| | | | | x | y | z |
| Example 1 | glycine | 1.50 | 311 | 32.33 | 0.72 | 4.32 |
| Example 2 | alanine | 0.82 | 230 | 30.23 | 0.67 | 5.32 |
| Example 3 | glycylglycine | 1.38 | 301 | — | — | — |
| Example 4 | Polyvinyl pyrrolidone | 0.13 | 186 | — | — | — |
| Example 5 | ethylenediamine | 1.16 | 333 | — | — | — |

—: not measured

TABLE 2

| | Compound Containing Iron | Oxygen Reduction Current Density ($mA/cm^2$) at 0.75 V Vs. RHE) | BET Specific Surface Area ($m^2/g$) | Elemental Analysis | | |
|---|---|---|---|---|---|---|
| | | | | x | y | z |
| Example 1 | iron acetate | 1.50 | 311 | 32.33 | 0.72 | 4.32 |
| Example 6 | hexacyano iron(II) ammonium 1.5-hydrate | 1.83 | 223 | 41.82 | 0.84 | 1.15 |
| Example 7 | ferrocene | 1.46 | 284 | 38.49 | 0.56 | 2.58 |

TABLE 3

| | Constituent Element | Oxygen Reduction Current Density (mA/cm² at 0.75 V Vs. RHE) | BET Specific Surface Area (m²/g) | Elemental Analysis | | | | | |
|---|---|---|---|---|---|---|---|---|---|
| | | | | a | b | c | x | y | z |
| Example 1 | FeCNO | 1.50 | 311 | 1 | | | 32.33 | 0.72 | 4.32 |
| Example 8 | CoCNO | 0.60 | 363 | | 1 | | 35.98 | 0.92 | 1.37 |
| Example 9 | FeCoCNO | 0.58 | 323 | 0.51 | 0.49 | | 33.96 | 1.09 | 6.85 |
| Example 10 | FeNiCNO | 0.18 | 339 | 1 | | 1 | 61.44 | 0.50 | 15.38 |
| Comparative Example 1 | NiCNO | 0.053 | 312 | | | 1 | 30.19 | 1.04 | 1.16 |

TABLE 4

| | pH | Oxygen Reduction Current Density (mA/cm² at 0.75 V Vs. RHE) | BET Specific Surface Area (m²/g) |
|---|---|---|---|
| Example 11 | 2.6 | 1.48 | 309 |
| Example 12 | 2.8 | 1.56 | 301 |
| Example 13 | 3.1 | 1.50 | 305 |
| Example 1 | 3.3 | 1.50 | 311 |
| Example 14 | 3.6 | 1.19 | 307 |
| Example 15 | 5.0 | 1.25 | 289 |

TABLE 5

| | Organic Acid | Oxygen Reduction Current Density (mA/cm² at 0.75 V Vs. RHE) | BET Specific Surface Area (m²/g) |
|---|---|---|---|
| Example 1 | acetic acid | 1.50 | 311 |
| Example 16 | methanesulfonic acid | 1.33 | 260 |

TABLE 6

| | Amount of Acetylacetone (ml) | Oxygen Reduction Current Density (mA/cm² at 0.75 V Vs. RHE) | BET Specific Surface Area (m²/g) |
|---|---|---|---|
| Example 17 | 0 | 1.02 | 328 |
| Example 18 | 3.4 | 1.03 | 302 |
| Example 1 | 5.118 | 1.50 | 311 |
| Example 19 | 6.8 | 1.06 | 338 |
| Example 20 | 8.5 | 1.08 | 340 |
| Example 21 | 10.2 | 1.20 | 352 |
| Example 22 | 13.7 | 1.16 | 333 |
| Example 23 | 20.5 | 1.06 | 336 |
| Example 24 | 30.7 | 0.71 | 309 |

TABLE 7

| | Gas Atmosphere | Oxygen Reduction Current Density (mA/cm² at 0.75 V Vs. RHE) | BET Specific Surface Area (m²/g) |
|---|---|---|---|
| Example 1 | 4% $H_2$, 96% $N_2$ | 1.50 | 311 |
| Example 25 | argon gas | 1.68 | 364 |

TABLE 8

| | Heat Treatment Temperature (° C.) | Oxygen Reduction Current Density (mA/cm² at 0.75 V Vs. RHE) | BET Specific Surface Area (m²/g) |
|---|---|---|---|
| Example 26 | 700 | 1.14 | 240 |
| Example 27 | 800 | 1.58 | 352 |
| Example 1 | 900 | 1.50 | 311 |
| Example 28 | 1000 | 0.94 | 303 |
| Example 29 | 1100 | 0.62 | 247 |

TABLE 9

| | Heating Rate (° C./min) | Oxygen Reduction Current Density (mA/cm² at 0.75 V Vs. RHE) | BET Specific Surface Area (m²/g) |
|---|---|---|---|
| Example 30 | 5 | 0.95 | 307 |
| Example 1 | 20 | 1.50 | 311 |
| Example 31 | 40 | 1.02 | 245 |
| Example 32 | 60 | 0.77 | 246 |

The invention claimed is:

1. An oxygen reducing catalyst obtained by:
    a step (A) of mixing a compound (i) supplying a carbon element and a nitrogen element by heating in a non-oxidizing atmosphere, a compound (ii) comprising at least one element of iron and cobalt, a solvent, and an acid to prepare a catalyst precursor solution having pH of not more than 3.5;
    a step (B) of removing the solvent from the catalyst precursor solution, and
    a step (C) of heat-treating, in a non-oxidizing atmosphere, a catalyst precursor obtained from the step (B), wherein the catalyst precursor comprises a uniform mixture of the compound (i) and the compound (ii).

2. The oxygen reducing catalyst according to claim 1, wherein the proportion of atomic numbers of iron, cobalt, carbon, nitrogen and oxygen in elements contained in the oxygen reducing catalyst is (total atomic number of iron and cobalt): atomic number of carbon: atomic number of nitrogen: atomic number of oxygen=1: x:y:z wherein $10 \leq x \leq 65$, $0 < y \leq 2$ and $0 < z \leq 20$.

3. The oxygen reducing catalyst according to claim 1, which is a fuel cell electrode catalyst.

4. A fuel cell catalyst layer comprising the oxygen reducing catalyst according to claim 3.

5. An electrode comprising the fuel cell catalyst layer according to claim 4, and a gas diffusion layer.

6. A membrane-electrode assembly comprising a cathode, an anode and an electrolyte membrane interposed between the cathode and the anode, wherein the cathode and/or the anode is the electrode according to claim 5.

7. A fuel cell comprising the membrane-electrode assembly according to claim 6.

8. A polymer electrolyte fuel cell comprising the membrane-electrode assembly according to claim 6.

9. The oxygen reducing catalyst according to claim 1, wherein the acid is an organic acid.

10. A process for producing the oxygen reducing catalyst according to claim 1, comprising:
   (A) mixing the compound (i), the compound (ii), the solvent and the acid to prepare the catalyst precursor solution having a pH of not more then 3.5;
   (B) removing the solvent from the catalyst precursor solution; and
   (C) heat-treating, in a non-oxidizing atmosphere, a catalyst precursor obtained from step (B), wherein the catalyst precursor comprises a uniform mixture of the compound (i) and the compound (ii).

11. The process for producing an oxygen reducing catalyst according to claim 10, wherein the compound (ii) is a compound not containing titanium.

12. The process for producing an oxygen reducing catalyst according to claim 10, wherein the ratio of the atomic number of carbon contained in the oxygen reducing catalyst to the total atomic number of iron and cobalt contained in the oxygen reducing catalyst is 10 to 65, provided that the total atomic number of the metal elements is 1.

13. The process for producing an oxygen reducing catalyst according to claim 10, wherein the compound (ii) is at least one selected from organic acid salts, inorganic acid salts, organic complexes, inorganic complexes, alkoxides and other organometallic compounds.

14. The process for producing an oxygen reducing catalyst according to claim 10, wherein the compound (i) is an α-nitrogen carboxylic acid.

15. The process for producing an oxygen reducing catalyst according to claim 14, wherein the α-nitrogen carboxylic acid is at least one selected from glycine, glycylglycine, alanine, alanylalanine and norvaline.

16. The process for producing an oxygen reducing catalyst according to claim 10, wherein the pH of the catalyst precursor solution is controlled using an organic acid.

17. The process for producing an oxygen reducing catalyst according to claim 16, wherein the organic acid is acetic acid.

18. The process for producing an oxygen reducing catalyst according to claim 10, wherein the catalyst precursor solution contains 1 to 20% by mass of a ketone, an alcohol or an ether.

19. The process for producing an oxygen reducing catalyst according to claim 18, wherein the catalyst precursor solution comprises a ketone, and the ketone is 1,3-diketone.

20. The process for producing an oxygen reducing catalyst according to claim 10, wherein the non-oxidizing atmosphere is:
   at least one gas atmosphere selected from nitrogen, argon, ammonia and hydrogen cyanide, or
   a mixed gas atmosphere of at least one gas selected from nitrogen, argon, ammonia and hydrogen cyanide and at least one gas selected from hydrogen, methane, propane, butane and carbon monoxide.

21. The process for producing an oxygen reducing catalyst according to claim 10, wherein the heat treatment temperature is 800 to 1100° C.

22. The process for producing an oxygen reducing catalyst according to claim 10, wherein the heating rate in the heat treatment is 10 to 40° C./min.

* * * * *